US008391561B2

(12) United States Patent
Takman et al.

(10) Patent No.: US 8,391,561 B2
(45) Date of Patent: Mar. 5, 2013

(54) PRE TENSION MONITORING SOLUTION

(75) Inventors: Olle Takman, Mölnlycke (SE); Jonas Nilsagård, Sävedalen (SE)

(73) Assignee: G-coder Systems AB, Västra Frölunda (SE)

( * ) Notice: Subject to any disclaimer, the term of this patent is extended or adjusted under 35 U.S.C. 154(b) by 349 days.

(21) Appl. No.: 12/667,313

(22) PCT Filed: Jul. 3, 2008

(86) PCT No.: PCT/SE2008/050829
§ 371 (c)(1),
(2), (4) Date: Apr. 27, 2010

(87) PCT Pub. No.: WO2009/005468
PCT Pub. Date: Jan. 8, 2009

(65) Prior Publication Data
US 2010/0208940 A1  Aug. 19, 2010

(30) Foreign Application Priority Data
Jul. 3, 2007 (SE) ...................................... 0701628

(51) Int. Cl.
*G06K 9/00* (2006.01)
(52) U.S. Cl. ........... 382/108; 382/103; 73/1.75; 73/760; 73/761; 73/781; 29/407.01
(58) Field of Classification Search .................... 73/1.75, 73/800, 760, 761, 781; 382/103–106
See application file for complete search history.

(56) References Cited

U.S. PATENT DOCUMENTS

| 4,322,193 A |   | 3/1982 | Stahl |
|---|---|---|---|
| 4,805,461 A | * | 2/1989 | Gupta et al. ..................... 73/800 |
| 5,726,907 A | * | 3/1998 | Davidson et al. ............... 702/42 |

(Continued)

FOREIGN PATENT DOCUMENTS

| EP | 453650 A1 * | 10/1991 |
|---|---|---|
| FR | 2 823 849 A1 | 10/2002 |

(Continued)

OTHER PUBLICATIONS

International Search Report for PCT/SE2008/050829 completed Nov. 5, 2008.

(Continued)

*Primary Examiner* — Chan S Park
*Assistant Examiner* — Iman K Kholdebarin
(74) *Attorney, Agent, or Firm* — Buchanan Ingersoll & Rooney PC

(57) ABSTRACT

The present invention relates to a tension monitoring system comprising: —at least one camera for acquiring at least one image of at least one pattern located on an object of interest, wherein the pattern comprises a plurality of points and where each point is arranged on the object in such as way as to follow the movement of the object; —a computational device; wherein the computational device is arranged to analyze the acquired image for detecting the position of each pattern point using an image analysis algorithm arranged to determine the geometrical center of a point using a contrast detection method, determining the distance between at least two pattern portions, and calculating the tension induced in the object using a reference value of distance between the two pattern portions when the object is mechanically relaxed.

15 Claims, 7 Drawing Sheets

U.S. PATENT DOCUMENTS

| | | | | |
|---|---|---|---|---|
| 5,728,944 | A | * | 3/1998 | Nadolink ........................ 73/800 |
| 6,006,610 | A | * | 12/1999 | Lehnert ...................... 73/862.08 |
| 6,829,944 | B1 | * | 12/2004 | Gleman et al. .................. 73/761 |
| 6,899,495 | B2 | * | 5/2005 | Hansson et al. ............... 408/144 |
| 7,024,938 | B2 | * | 4/2006 | Gleman et al. .................. 73/761 |
| 7,277,021 | B2 | * | 10/2007 | Beebe et al. .................. 340/665 |
| 7,278,323 | B2 | * | 10/2007 | Hartmann et al. ............... 73/761 |
| 7,293,466 | B2 | * | 11/2007 | Ohta et al. ....................... 73/777 |
| 7,650,792 | B2 | * | 1/2010 | Kibblewhite ................... 73/761 |
| 7,679,730 | B2 | * | 3/2010 | Takano et al. ................... 356/32 |
| 7,892,627 | B2 | * | 2/2011 | Doughty .................... 428/195.1 |
| 7,946,179 | B2 | * | 5/2011 | Kibblewhite et al. ............ 73/761 |
| 7,966,896 | B2 | * | 6/2011 | Chang et al. ............... 73/862.08 |
| 2006/0225484 | A1 | * | 10/2006 | Gleman et al. ................. 73/1.75 |
| 2007/0209447 | A1 | * | 9/2007 | Christ et al. ..................... 73/800 |
| 2008/0176077 | A1 | * | 7/2008 | Doughty ....................... 428/409 |
| 2009/0177416 | A1 | | 7/2009 | Nilsagard et al. |

FOREIGN PATENT DOCUMENTS

| | | |
|---|---|---|
| FR | 2 835 603 A1 | 8/2003 |
| JP | 11-31406 A | 2/1999 |
| WO | WO 94/14029 A1 | 6/1994 |
| WO | WO 2007/073272 A1 | 6/2007 |

OTHER PUBLICATIONS

Written Opinion for PCT/SE2008/050829 completed Nov. 5, 2008.

* cited by examiner

PRE TENSION MONITORING SOLUTION

TECHNICAL FIELD

The present invention relates to a sensor solution and in particular to a tension monitoring system for monitoring mechanical pre tension in a material using a vision based method.

BACKGROUND OF THE INVENTION

In conventional techniques for measuring strain induced from forces applied to material, for instance torque or linear strain applications, sensors have been fastened to the material to be measured on and then an electrical coupling is established between the sensors and conditioning and analyzing electronics. This has drawbacks, for instance in a need for the electrical coupling to be maintained with a suitable quality over time, e.g. a problem in applications involving rotary parts forming the object of interest while the conditioning and analysis electronics is stationary. A typical example of such a situation is the use of strain gauges using resistive techniques measuring torque in a rotary shaft, these use slip rings to connect the sensors with electronics; the slip rings tend to degrade in quality over time due to wear of the connection interface. Strain gauges are also quite expensive and limit the applicability to certain test measurements and not specially suited for routine setups. Strain sensor may be used for detecting tension applied in materials due to mechanical forces.

For this purpose a number of different technologies have been developed in order to increase the quality and/or resolution. Sensor systems utilizing magnetic couplings in different forms, capacitive couplings, and vision based have thus been developed. Each with their own drawbacks in the form of prone to interference from external sources or error, reduced resolution, increased cost, and reduced reliability.

For instance vision based solutions often adhere to low resolution and/or require complex and expensive optical and mechanical setups. However, vision based solutions have one advantage of being more easily used in non stationary applications, i.e. where the image acquisition device does not need to be permanently fixed in a position relative the object to be measured on, but it can be removed and later (in time) brought back to measure again.

One such solution is presented in JP1131406 wherein an image acquisition device detects a pattern of Moiré fringes and determines the strain from the distance between the fringes. However, this technique requires high quality optics and can only be used for measuring strain in one direction at a time.

Another example is mentioned in WO9414029 wherein a measuring system for strain analysis of three dimensional patterned components is disclosed. This system utilizes a CMM solution with a camera measuring on a pattern formed on the object of interest. This is an expensive and mechanically complex solution in need for calibration of the pattern and which further has a low resolution.

Another solution may be found in FR2823849 using a vision based solution for measuring deformation and strain in an object.

FR 2835603 discloses a vision based solution for measurement of displacement and/or deformation of an object. However, this document does not mention the measurement of strain.

WO 2007/073272 discloses a device, method and system for determining a position of an object, and in particular a vision based solution using a pattern comprising absolute position data.

It is an object of the present invention to remedy at least one of these problems.

SUMMARY OF THE INVENTION

This is achieved in a number of aspects of the present invention, in which a first is a tension monitoring system, comprising:
 a object part of fastening means securing a first object in relation to a second object, provided with at least one pattern located on the surface of said object and where the pattern comprises pattern portions arranged relative each other with a distance between pattern portions on a distance scale suitable for detecting tension within a pre determined range and resolution, wherein the pattern portions comprises a plurality of points and where each point is arranged fixedly on the object;
 at least one camera (4, 33, 33', 701) for acquiring at least one image of the at least one pattern (3, 23, 32, 32', 704) located on the object (2, 22, 31, 707);
 a computational device (500) arranged to receive image information from the at least one camera;
 wherein the computational device is arranged to analyze the acquired image for detecting the position of each pattern point using an image analysis algorithm arranged to determine the geometrical centre of a point using a contrast detection method, determining the distance between at least two pattern portions, and calculating the tension induced in the object using a reference value of distance between the two pattern portions when the object is mechanically relaxed.

The pattern may further comprise information points.

The information points may comprise information about at least one of relative positions on the object, distance to at least one adjacent point, and calibration information.

The computational device may further be arranged to acquire information related to the distance between the camera and the object.

The computational device may be arranged to compensate the strain calculation for distance effects.

A further aspect of the present invention is a strain detecting device, comprising:
 at least one camera for acquiring at least one image of at least one pattern located on an object of interest, wherein the pattern comprises a plurality of points and where each point is arranged on the object in such as way as to follow the movement of the object;
 a computational device;
 wherein the computational device is arranged to analyze the acquired image for detecting the position of each pattern point using an algorithm arranged to determine the geometrical centre of a point using a contrast detection method, determining the distance between at least two pattern points, and calculating the strain induced in the object using a reference value of unstrained distance between the two pattern points.

The pattern may further comprise information points.

The information points may comprise information about at least one of relative positions on the object, distance to at least one adjacent point, and calibration information.

The computational device may further be arranged to acquire information related to the distance between the camera and the object.

The computational device may be arranged to compensate the strain calculation for distance effects.

Another aspect of the present invention, a method of detecting strain in an object is provided, comprising the steps of:
providing a contrast variation pattern mechanically on the object;
acquiring at least one image of the pattern;
analysing the pattern;
determining geometrical centres of pattern points;
measuring distance between at least two pattern points;
calculating distance between the two pattern points in an unstrained condition using a reference value;
calculating strain in the object as a function of the measured and calculated distances.

Yet another aspect of the present invention, a computer program stored in a computer readable memory and run in a processing device for detecting strain in an object is provided, comprising instructions set for:
acquiring at least one image of the pattern using a camera connected directly or indirectly to the processing device;
analysing the pattern;
determining geometrical centres of pattern points;
measuring distance between at least two pattern points;
calculating distance between the two pattern points in an unstrained condition using a reference value;
calculating strain in the object as a function of the measured and calculated distances;
presenting the calculated strain.

Still another aspect of the present invention, a system for monitoring strain in an object is provided, comprising
an object;
a pattern with a contrast variation located on a surface of the object;
a camera for acquiring images of the pattern;
a computational device connected to the camera;
wherein the computational device is arranged to analyze the acquired image for detecting the position of each pattern point using an algorithm arranged to determine the geometrical centre of a point using a contrast detection method, determining the distance between at least two pattern points, and calculating the strain induced in the object.

Furthermore, the present invention may be realized as a washer for use in a fastening arrangement, comprising an elastic material and provided on the surface with a pattern of a plurality of points with contrast variations suitable for determining geometrical centres of each pattern point, wherein the pattern is provided in such a way as to be subjected to induced strain in the washer.

An advantage of the present invention is that strain may be measured in several directions simultaneously. It is possible to obtain measurements at several locations using the same detecting device leading to a geometric strain profile. Also, it is possible to obtain measurements of other parameters, such as different types of strain (linear, bending, torque, and torque in linear applications) and position of object relative detecting device.

One may obtain information about the identity of the object and/or calibration data encoded in the pattern located on the object.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
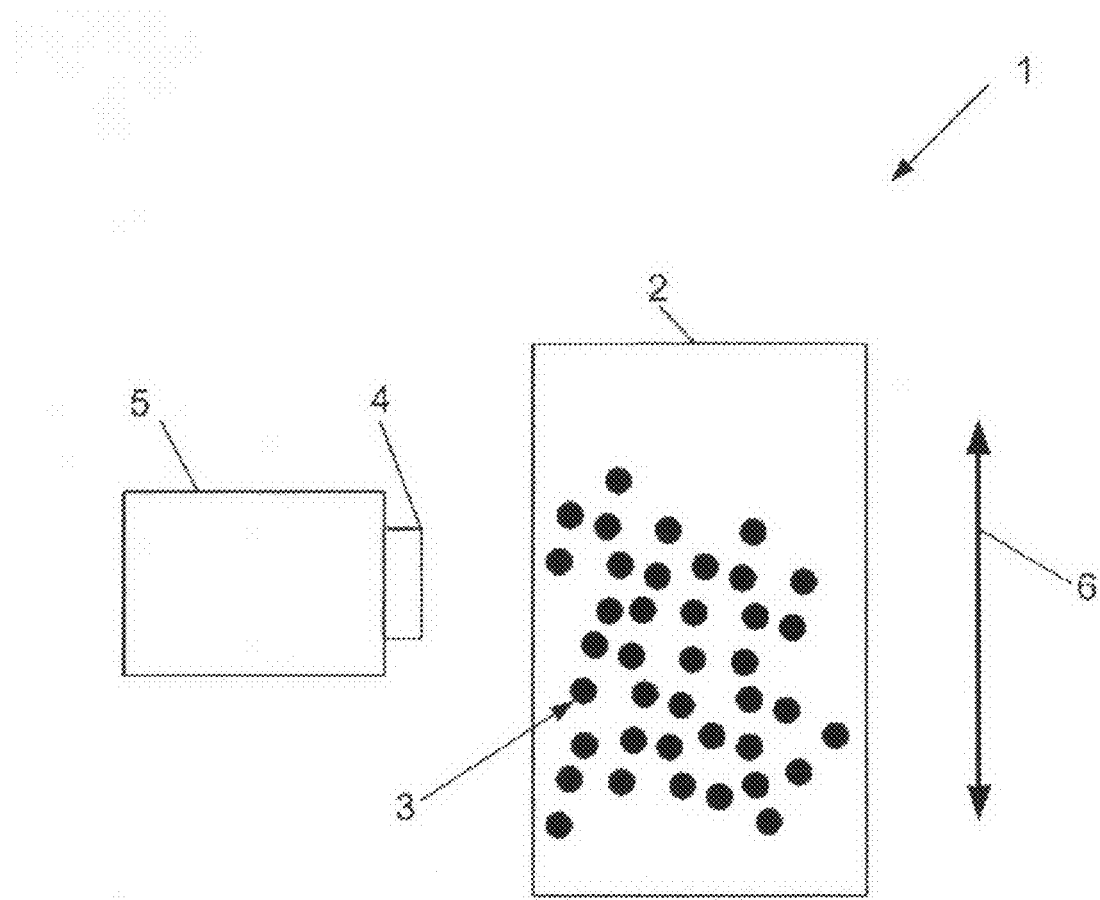
FIG. 1 illustrates schematically a strain sensor system according to the present invention according to a first embodiment.

Referring to FIG. 1 illustrating a strain sensor or tension monitoring system 1 according to the present invention wherein reference numeral 2 illustrates an object where strain (the principal direction of the strain is indicated by arrow 6 in FIG. 1 is induced due to some mechanical process and which strain is of interest to measure. A pattern 3 is provided on the object, the pattern comprises node points and optionally location/information points. The pattern will be discussed in more detail further below in this document. An image acquisition device (e.g. a camera) 4 detects the pattern and sends a signal relating to the pattern to an analysis device for image analysis. The analysis device may be incorporated in the same sensor system encapsulation 5 together with the camera 4. The analysis device determines the location of each individual pattern part using preferably a centroid algorithm or an algorithm determining the geometrical centre of the pattern part. From this analysis it is possible to determine the location of the pattern on the object, if the pattern is uniquely coded also the object may be identified, and mechanical position of part of the pattern with respect to other parts of the pattern may be located, i.e. knowing the unstrained mechanical location of the parts of the pattern it is possible to determine the strain induced in the object between the pattern parts.

A few examples of application of the invention will now be described below. In a first application, strain/tension is measured with respect to an object subjected to a static or semi static tension applied through some forces in the system leading to a strain in the material. For instance, a bolt and nut used for holding another object is subjected to a strain when the nut has been put into operation. This strain/tension is measurable on the nut, the bolt head, or on a separate washer inserted between the nut or the bolt head and the other object (the object to be fastened using the bolt and nut). It should be appreciated that the nut may be dispensed with if the bolt threads fit into a threaded receiving portion located on a fixed object to which the other object is to be fixated to. For instance assume a wheel to be fastened to a car. The wheel is often fastened using a plurality of bolts put into receiving holes in the wheel from one side of the wheel and on the other side of the wheel there are located a plurality of receiving structures which are threaded so as to lock the bolts when they are screwed into these receiving structures. A washer may be located between the bolt and the wheel and strain induced in the tightening operation will be transferred to the washer also. A testing device may be used for checking a current status of the strain in order to assure the driver that each bolt holding the wheels are suitable tightly fitted. Another example where such a solution is of interest is the fastening of a cylinder head of a motor where it is of interest to obtain a uniform and symmetrical fastening of the cylinder head against the engine block.

There are some areas of technology where it is imperative that each bolt holding a structure is tightly mounted and that the bolts keep a certain amount of tightness (i.e. a certain level of strain in the fixation structure). These areas of technology involve pressure vessels, large bearings located for instance in relation to oil rigs in the oil industry, large crane structures at building sites, and so on where complex accidents may occur if one or several bolts are faulty. For example in the oil industry, there are insurance demands on checking the operation of each bolt in bearing structures and similarly this is true for pressure. vessels within the nuclear energy production industry. Therefore there is an interest in having a quick and reliable means for measuring strain in bolts.

Figure 2:
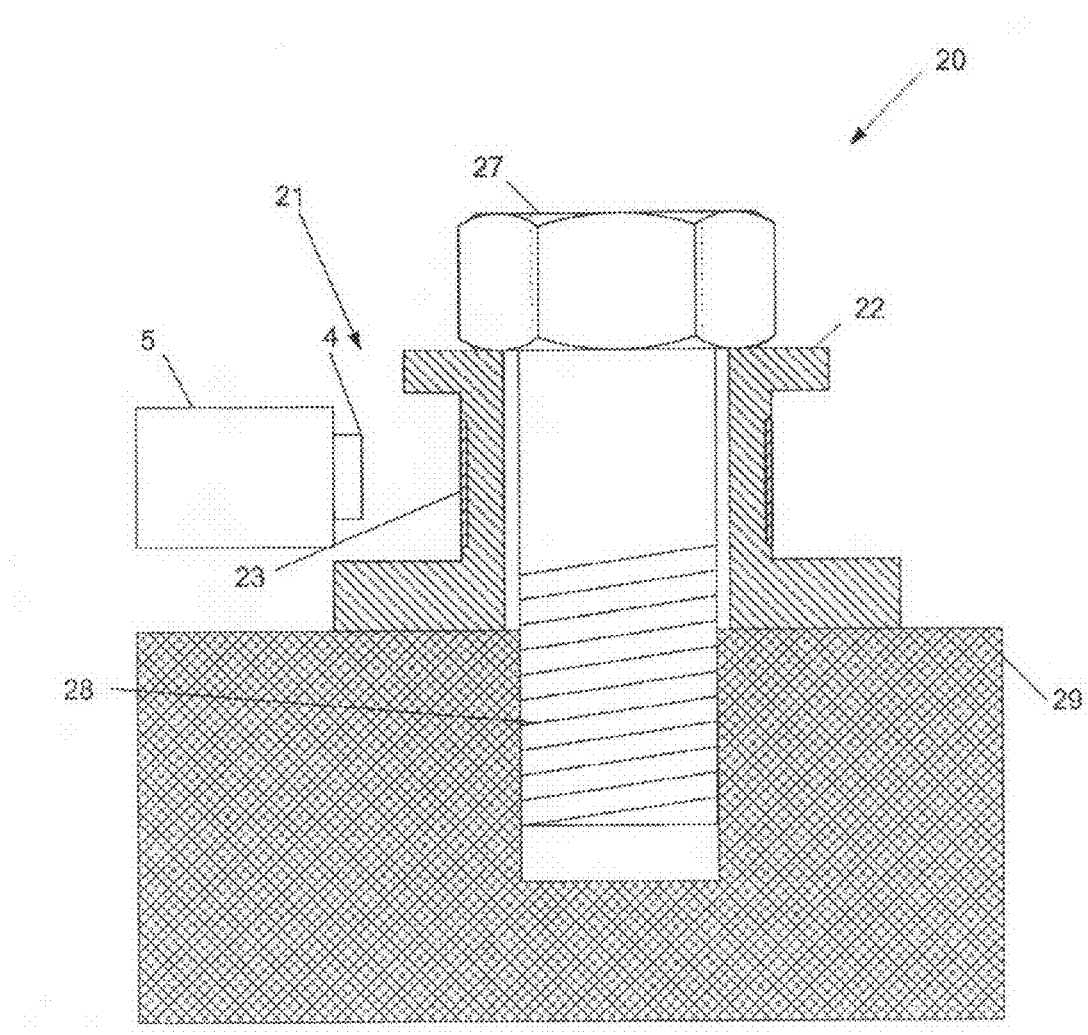
FIG. 2 illustrates schematically a strain sensor system according to a second embodiment of the present invention.

FIG. 2 shows in a side view a variant of the example described above: a screw/bolt 27 with a threaded portion 28 that fits to a threaded portion (not shown) in an object 29. A washer 22 comprising a pattern 23 is fitted between the screw head 20 and the object 29. The screw and object can be seen as a fastening arrangement 21. A camera 4 with analysis device (as discussed in relation to FIG. 1) and encapsulation 5 is provided for acquiring images of the pattern. The washer with pattern and camera with encapsulation may be seen as a sensor system 21 in this embodiment. When the screw/bolt is fastened into the object a tension is provided in the screw and the washer. This tension leads to a change of geometrical dimension of the washer which in turn will effect the relative position of the pattern parts. For instance, if the pattern comprises points, the distance between centers of the points will change. This distance change may be detected using the centroid algorithm discussed above and thus the applied tension may be determined.

The fastening of the screw/bolt into the object may be done by either turning the screw using a torque (for instance using a wrench) or using a bolt tensioner (such as a hydrocam) as understood by the person skilled in the art. A bolt tensioner operates by applying a drag force to the bolt when it has been fastened finger tight to the object with a washer in between the bolt head and the object. When the drag force is applied the bolt is stretched and the washer is loosened slightly. By fastening the washer (which is threaded on the inside, and which thread fits to the thread of the screw) on to the object by screwing it towards the object and thereafter releasing the drag force, a pre tension is provided. It should be noted that the washer need not be threaded but can be applied during applying the drag force; the washer then needs to have an open portion in order to be pushed in under the screw head. Usually, the bolt in the bolt tensioner application comprises a pin bolt arrangement with a nut being tightened to the washer; however, other solutions may be used where a washer may be utilized.

Figure 8:
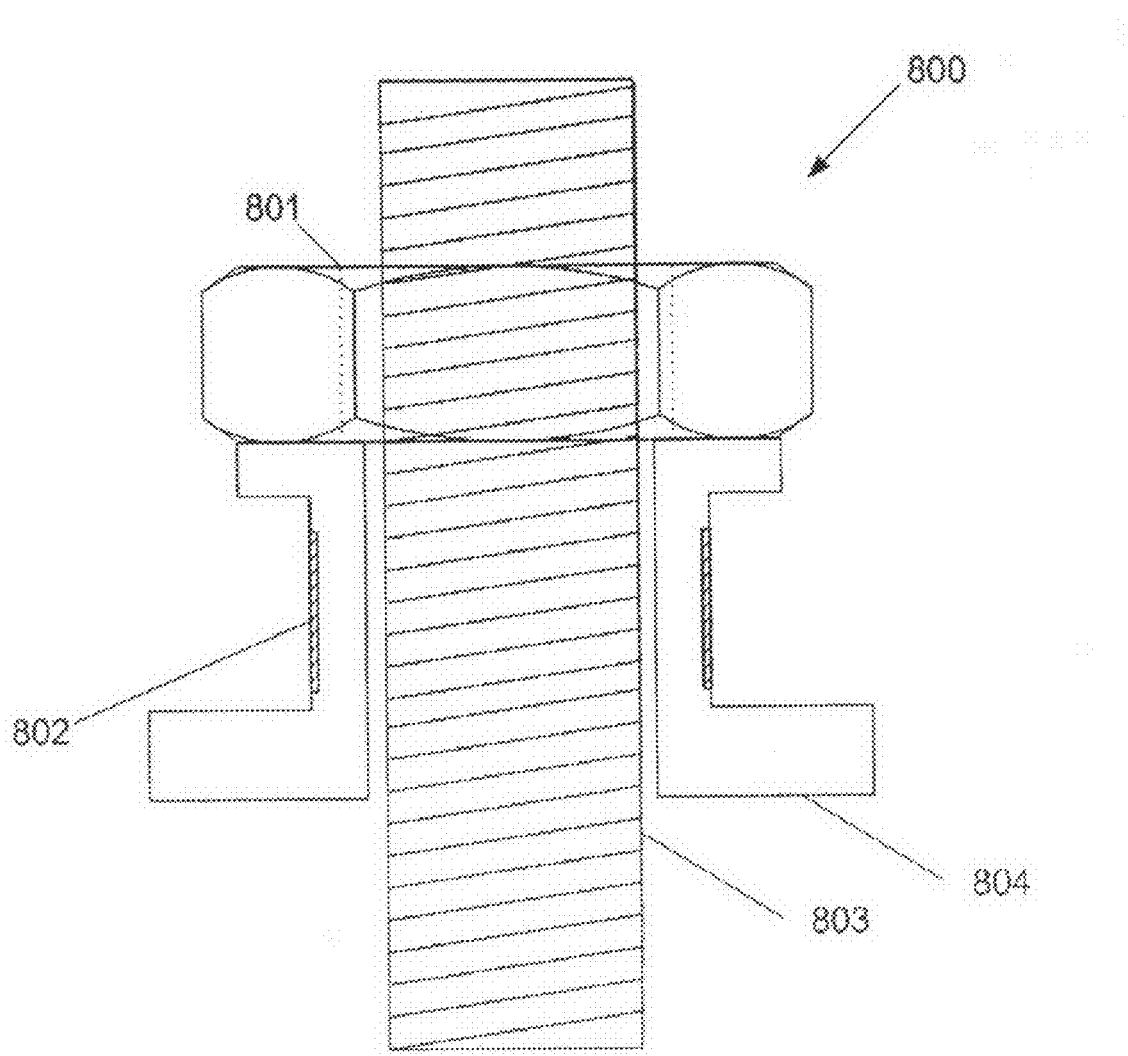
FIG. 8 illustrates schematically another embodiment of the present invention.

It should be noted that in another embodiment of the present invention, the washer may be incorporated into the nut in a suitable manner as long as the forces applied during tensioning are transferred through the washer part of the nut. FIG. 8 illustrates one example where the nut/washer has been incorporated. The bolt head may also be incorporated with a washer (not shown). FIG. 8 will be discussed later in this document in more detail.

For this type of application with washer and/or bolt with incorporated washer, the present invention is advantageously applicable for dimensions relating to M10 or larger systems. for instance M16 and M20 and so on However, the invention is not limited to this range: it may still be applicable to smaller dimensions. Furthermore, the present invention is not limited to metric configurations but is applicable to any system: the reference to metric M20 is only for illustrating an example of dimension.

As seen above the detection is provided on structures being load bearing and which may be part of the object, e.g. the bolt or the combined washer/screw solution, furthermore detection may be provided directly on the object for instance a load bearing part of a roller/ball bearing assembly; when mounting a bearing to a shaft it may be fixed using crimp methods and thus the inner (or the outer) ring of the bearing is subjected to forces pre tensioning the system.

The camera/analysis setup may be provided permanently together with the washer or it may be provided as a field module to be used intermittently on field inspections of tension in the fastening arrangement 21. For instance, an inspecting user may be equipped with a probe (comprising the camera, analysis device, and a display unit for displaying a detected tension value) which he takes with him on inspection tours to equipment that is of need to be inspected. The user then approaches the equipment to test and enters the probe into a fixture (not shown) located in relation to the pattern such as to provide a rigid receiving fixture and allow for high reproducibility between measurements when the probe is removed and later put back again.

The fixture or guide may provide a solution for positioning the probe at a fix distance to the pattern and where the distance do not vary between different measurements since the distance between the camera and the pattern will lead to an error of the measurement; the distance between points in the pattern in an acquired image will vary as a function of distance between camera and pattern as well applied tension.

Figure 7:
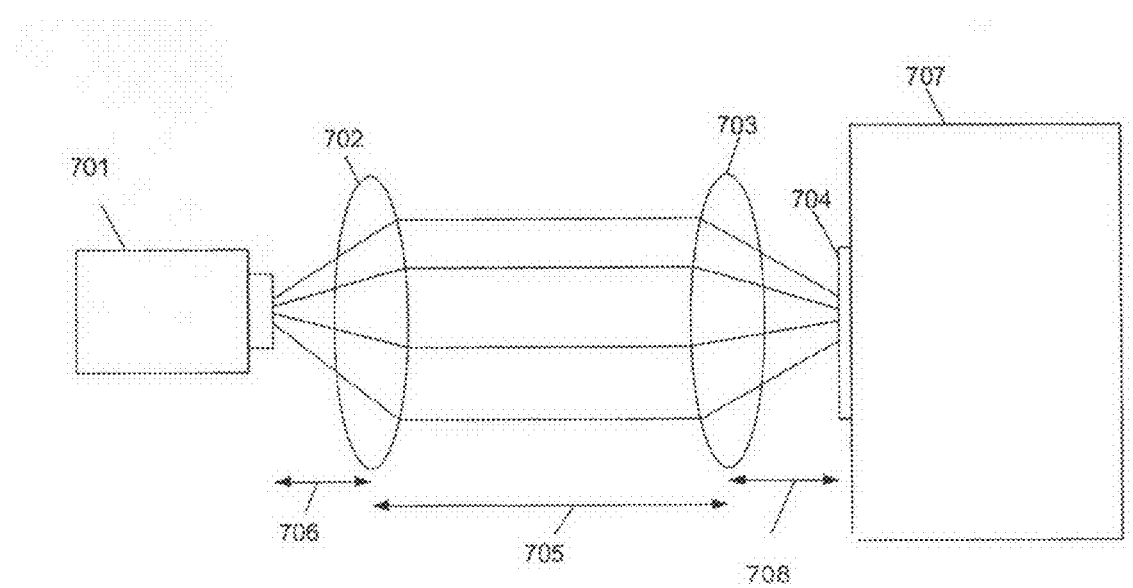
FIG. 7 illustrates schematically a lens arrangement according to the present invention.

This error may be further reduced using appropriate lenses in the camera. A lens arrangement (as indicated by FIG. 7) may comprise a solution where one lens 702 is located in relation to the camera 701 and one lens 703 is arranged in relation to the pattern 704. The lens arrangement will provide a solution where a parallel beam 705 of light is transferred from the pattern to the camera in such a way as to make the detecting system substantially independent on distance 705 between the camera and the pattern since the distance 706 between the first lens 702 and the camera 701 is fixed and the distance 708 between the second lens 703 and the pattern 704 is also fixed. Alternatively, no fixture is provided but the sensing system depends on the lens system as described.

Additionally or complementary the image analysis may be used to use the pattern itself as a reference for determining the distance between the camera and the pattern by using the fact that the induced strain from the tension operates in a certain direction mainly and affects the distance between points in the pattern in mainly one direction and leaves the distances between points in another direction more or less unaffected or by analyzing the relationship between the different points part of the pattern. Thus by determining the distance between points in an unaffected direction it is possible to deduce the distance to the pattern from the camera since the distance between points when the pattern is unstrained is known. Yet another solution would be to determine the distance through some other measurement, for instance using a mechanical arrangement (e.g. a micrometer screw or similar length measuring device) or an optical measurement arrangement (e.g. a laser device).

In order to further improve the sensitivity and resolution of the strain sensor a temperature sensor may be used in order to handle temperature effects on the system and the object.

Further, one may measure on several locations around the perimeter of the washer and averaging the measurements in order to handle any imbalance problems of the washer in relation to the screw/object. Measurements on several locations may also provide information about the tension around the perimeter to determine if any specific part of the washer/screw is broken in any way.

The washer is preferably made of a material with mechanical properties suitable for the range of strains that will be induced and with long term stability properties in order to be used for a suitable time. Metallic material of suitable dimension is preferred, for instance stainless steel, aluminum, iron, copper, brass, titanium, and so on. The washer may be provided with an oxidation reducing coating or some other suitable physical protection.

The pattern may be provided by directly incorporating it with the washer through electroplating, laser inducement, mechanical inducement, and so on, or it may be provided on a separate film fitted to the washer (e.g. as a printed pattern on a plastic of metallic film which is glued to the washer).

It is also possible to measure torque on the washer or screw by measuring angular distortion of the pattern.

The pattern may optionally be provided on a side of the screw head in a position close to the object where there under certain conditions may be induced strain.

Figure 3A:
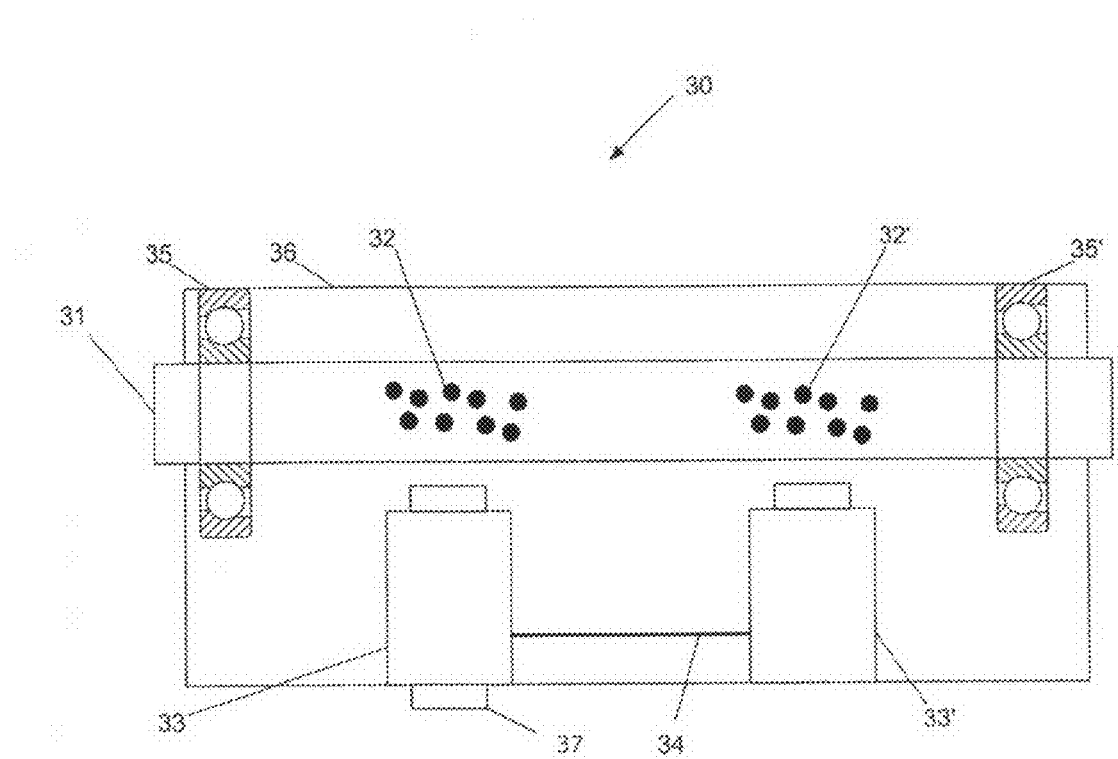
FIG. 3A illustrates schematically a torque sensor according to the present invention.

FIG. 3 illustrates schematically an example of an application for torque measurements (torque meter). A shaft 31 has two groups of patterns 32, 32' located a distance between them. A camera 33, 33' (optionally with means for analysis, e.g. electronics and/or computational device) is located at each pattern group in order to determine the location of the pattern with respect to the other pattern group. If the shaft is subjected to a torque the two patterns will have an angular shift with respect to each other. If the two cameras are synchronized in time it is possible to determine this angular difference and deduce the torque in the shaft 31. In an alternative embodiment one single camera may be used if it is arranged to acquire an image large enough to accommodate both patterns. In another embodiment one camera is used to acquire an image of one pattern group: if the torque is large enough or the required sensitivity, resolution, and/or range of the measurement device allows it, the points in the pattern group will deflect from each other which is an indication of the torque. The synchronization may be done conveniently in a communication link 34 between the camera systems. It should be noted that the camera is not limited to detect visible light but may be arranged to detect some other part of the electromagnetic spectrum: such as ultraviolet or infrared spectrum parts.

The torque meter 30 may be housed in a single housing 36 and may comprise one or several cameras 33, 33', an interface 37 to communicate measurement values and bearings 35, 35' to support a shaft 31. The shaft may be provided together with this torque meter 30 or it may be supplied by the user himself. In case of supplied with the torque meter, it may be provided with means for connecting (e.g. some kind of splined coupling in one or both ends depending on application) to another shaft in order to fit with existing parts of an assembly wherein the torque meter finds applicability. However, the torque meter may also be mounted around an existing shaft application by sliding the torque meter on to the shaft which has been prepared with a suitable pattern.

The analysis of the images may be done in the cameras or in a separate computational device (not shown)

Figure 3B:
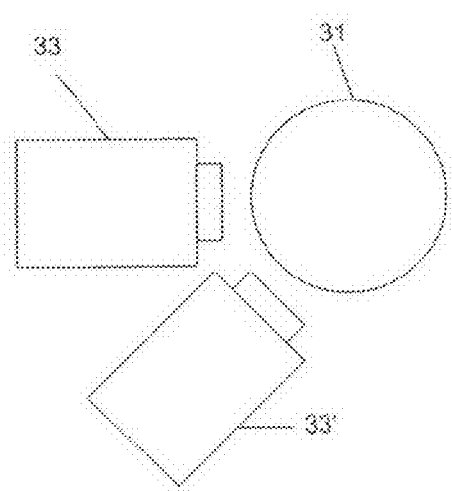
FIG. 3B shows a schematic partial side view of FIG. 3A.

In an application where it is of interest to measure torque, it may be advantageous to use more than one camera depending on resolution required. Furthermore, the present invention may provide a solution which may give additional information about the system it measures on: for instance position of the object on which torque is measured on or rotational speed of the object. With a plurality of cameras the system may provide information about the translation of the shaft in x, y, and z directions with respect to the cameras. The plurality of cameras are preferably mounted with an angular difference from each other as seen in FIG. 3B, where camera 33 and 33' are mounted with approximately 45 degrees difference around the shaft 31. The angle may be in a range from 0 to 360 degrees.

Figure 4:
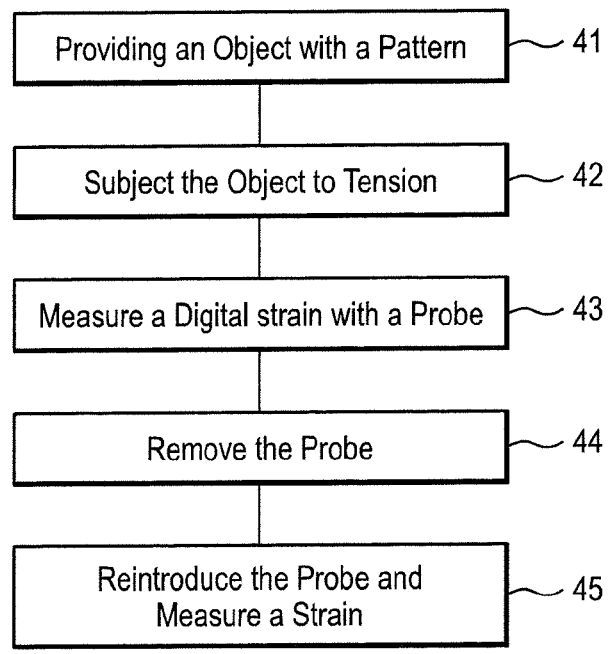
FIG. 4 illustrates schematically a method according to the present invention.

FIG. 4 illustrates a method of measuring strain in an object in an application where the strain is measured on an intermittent basis, for example where a field probe is used occasionally and removed between measurements.

41. Providing an object with a pattern in a position where induced tension will provide strain.
42. Subjecting the object to tension.
43. Measuring an initial strain after subjecting the object to strain and/or during the application of the tension by taking one or several images of the pattern using the above discussed strain detecting device. Analyzing the image and optionally storing the location of parts of the pattern. However, it should be noted that the pattern may be formed with a known distance between the parts of the pattern and then it is not necessary to store the information for the purpose of detecting the strain, but it may be of interest anyway since it may show a difference over time in the induced strain.
44. Removing the probe.
45. After some suitable time interval, return and measure again on the pattern in order to see if there has been any change and the value of the strain.

Figure 5:
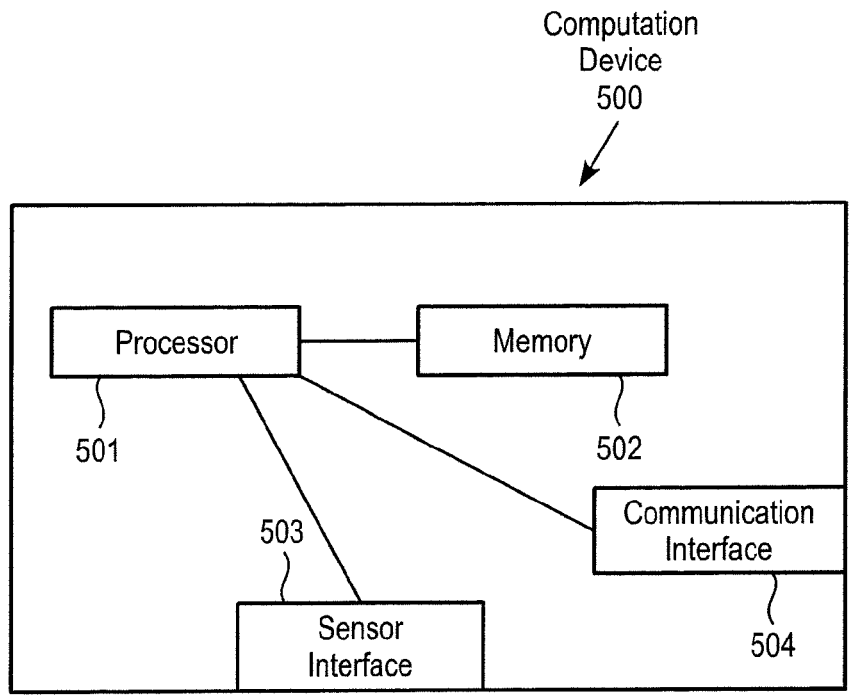
FIG. 5 illustrates schematically a measuring device according to the present invention.

Part of the invention relates to an analysis of the image acquired from the camera. This analysis is preferably performed by software in a computational device such as a microprocessor, FPGA (Field Programmable Gate Array), ASIC (Application Specific Integrated Circuit), PC, or similar device. FIG. 5 shows an example of such a computational device 500 with a processor 501 and memory 502 for storing software, results, and/or intermediate values. The memory may comprise a volatile or non-volatile memory or a combination of these. The memory may be at least one of a RAM, EPROM, EEPROM, Flash, hard disk, memory stick, or similar memory units as understood by the person skilled in the art.

The computational device may further comprise a sensor interface 503 and a communication interface 504. The sensor interface is arranged to communicate with the camera and may also further be arranged to receive signals from other sensors of interest to acquire data from. These sensors may for instance include temperature, humidity, magnetic and/or electrical field, velocity, rotational speed, or similarly. The communication interface may be arranged to be in contact with other devices through a communication protocol (e.g. Ethernet using IP, RS232, RS485, I2C, CAN bus, GPIB, HPIB, VXI, PXI, ISA, Firewire, USB, IDE, versions of PCI, versions of SCSI, and VME) in order to exchange data and control signals. The user may communicate with the computational device 500 from a PC for instance in order to acquire a reading from the device 500 and to set up the device 500 for measurement; setting measurement ranges, sensitivity, timing characteristics, and so on as understood by the skilled person. The computational device may be a separate device specifically arranged for the purpose of use in applications according to the present invention, or it may be part of some other device such as a PDA or mobile phone.

The computational device 500 may also comprise a direct user interface setup using a user interface located on the device, e.g. a touch panel connected to the computational device or buttons and/or other similar mechanical interface devices as understood by the skilled person.

The computational device 500 may also be arranged to communicate with a centrally located server in order to upload data and/or receive calibration data for the object under measurement.

Figure 6:
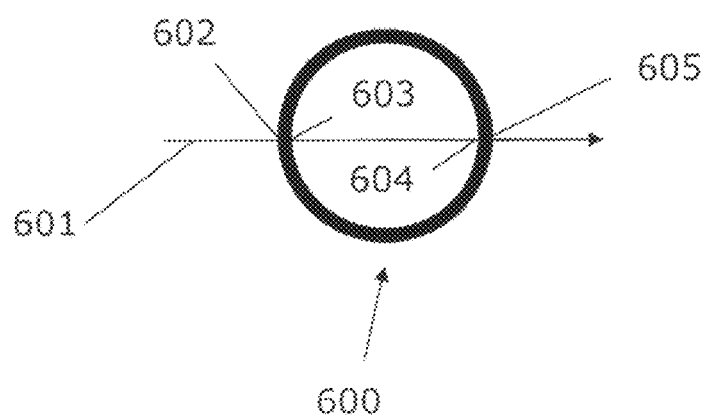
FIG. 6 illustrates schematically detail of a pattern node point used in the present invention.

The pattern nodes may comprise any suitable shape for digital detection of a geometrical centre of the shape, but comprises preferably circles 600 with unfilled central parts (as can be seen in FIG. 6), i.e. pattern points with a filled ring around a non filled central region. The advantage of having a pattern node with these characteristics is that the algorithm used for determining the position have four contrast shifting regions to measure (in FIG. 6 the arrow 601 indicate a direction of analysis): one 602 coming from the outside of the circle into the filled ring region, one 603 when exiting the filled region and entering into the unfilled central part, one 604 when coming from the unfilled central part into the filled ring on the opposite side as compared to the initial detection, and one 605 when exiting the filled ring part externally of the circle pattern part. However, it should be understood that other geometrical forms may be used; both with filled or unfilled central parts: e.g. squares, triangles, or any other shape. The analysis for determining the geometrical centre may be done in one or several directions of analysis depending on in which type of application the invention is used.

Furthermore, the pattern may also be provided with information points located in relation to each pattern node point. The information may be coded into a group of information points: e.g. a pattern group may comprise a plurality of points of the same or different character (or a combination thereof) and relative location of each other (also the absence of a point in the group of information points may be seen as an information point). The information points may provide information about location of the node point in relation to other node points (for instance giving possibility to obtain absolute position of each node point, or provide information about distance between adjacent node points in an unstrained condition (no need for storing such values centrally or locally) or other calibration information of interest (e.g. information related to any non linear effects in the application of the pattern onto the object, camera effects, strain effects: for instance if the strain induced is not linear in all directions).

The procedure for providing such calibration related information points may be to first provide the node points on the object, measure the distance between each adjacent node point, and provide the information points with this information on the object.

FIG. 8 illustrates an alternative embodiment where a nut 800 is provided with a combined nut head 801 for receiving a tightening tool and a washer portion 804 provided with a pattern 802. The strain is transferred through the washer portion and thus the strain may be detected using the pattern 802.

The present invention may find applicability in a number of specific applications, such as:
1. Measuring torque in a shaft from an electrical motor (the sensor may be incorporated into the electrical motor housing).
2. In conjunction with bearings, for instance in bearing housing.
3. Measurement of pre strained bolts, e.g. for determining the strain in bolts at different times and/or time intervals.
4. Measuring torque in a steering wheel shaft, for use in an electrical power steering application.
5. Measurement of strain in parts of bridges, buildings, water dams, seals, rails (of railways), wind mills, and parts of vehicles.
6. In measuring tension in fastening elements in applications such as large cranes.
7. In test rigs used in laboratory environments, for instance strain experiments for determining the tensile strength of materials and so on.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware, and that at least part of the invention may be implemented in either hardware or software.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A tension monitoring system, comprising:
a washer, being part of a fastener securing a first object in relation to a second object, said washer being provided with at least one pattern located on a surface of said washer and where the pattern comprises pattern portions arranged relative to each other with a distance between pattern portions on a distance scale suitable for detecting tension within a predetermined range and resolution, wherein the pattern portions each comprise a plurality of points and where each point is arranged fixedly on the washer;
at least one camera for acquiring at least one image of the at least one pattern located on the washer;
a computational device arranged to receive image information from the at least one camera;
wherein the computational device is arranged to analyze the acquired image for detecting the position of each point using an image analysis algorithm arranged to determine the geometrical centre of a point using a contrast detection method, determining the distance between at least two pattern portions, and calculating the tension induced in the washer using a reference value of distance between the two pattern portions when the washer is mechanically relaxed.

2. The system according to claim 1, wherein the pattern further comprises information points.

3. The system according to claim 2, wherein the information points comprise information about at least one of relative positions on the washer, distance to at least one adjacent point, and calibration information.

4. The system according to claim 1, wherein the computational device is further arranged to acquire information related to the distance between the camera and the washer.

5. The system according to claim 4, wherein the computational device is arranged to compensate the strain calculation for distance effects.

6. The system according to claim 1, wherein the washer is arranged with a geometrical structure enhancing deformation effects on the surface where the pattern is located.

7. The system according to claim 6, wherein the geometrical structure comprise a waist located between two contact surfaces in a direction along a bolt longitudinal axis.

8. The system according to claim 7, wherein the waist is located on at least one of the outer periphery or the inner periphery of the washer.

9. The system according to claim 1, wherein the washer is suitable for fitting in relation to a bolt equal to or larger than an M16 bolt.

10. The system according to claim 1, wherein the washer comprises a guidance structure for receiving the camera relative to the object.

11. The system according to claim 1, wherein the camera is movable relative the washer.

12. A washer for use in the tension monitoring system according to claim 1, said washer comprising:
   a surface with at least one pattern, the pattern comprising pattern portions arranged relative to each other with a distance between pattern portions on a distance scale suitable for detecting tension within a predetermined range and resolution, wherein the pattern portions include a plurality of points and where each point is arranged fixedly on the washer.

13. The system according to claim 1, wherein the pattern further is uniquely coded.

14. The system according to claim 1, wherein the fastener comprises a pre-strained bolt.

15. A tension monitoring system, comprising:
   a washer being part of a fastener securing a first object in relation to a second object, said washer being provided with at least one pattern located on the surface of said washer and where the pattern comprises pattern portions arranged relative to each other with a distance between pattern portions on a distance scale suitable for detecting tension within a predetermined range and resolution, wherein the pattern portions comprise a plurality of points and where each point is arranged fixedly on the washer,
   at least one camera for acquiring at least one image of the at least one pattern located on the washer;
   a computational device arranged to receive image information from the at least one camera;
   wherein the computational device is arranged to analyze the acquired image for detecting the position of each point using an image analysis algorithm arranged to determine the geometrical centre of a point using a contrast detection method, determining the distance between at least two pattern portions, and calculating the tension induced in the washer using a reference value of distance between the two pattern portions when the washer is mechanically relaxed, and
   wherein the computational device is further arranged to acquire information related to the distance between the camera and the washer using the pattern itself as a reference for determining the distance between the camera and the washer.

* * * * *